Figure 1:
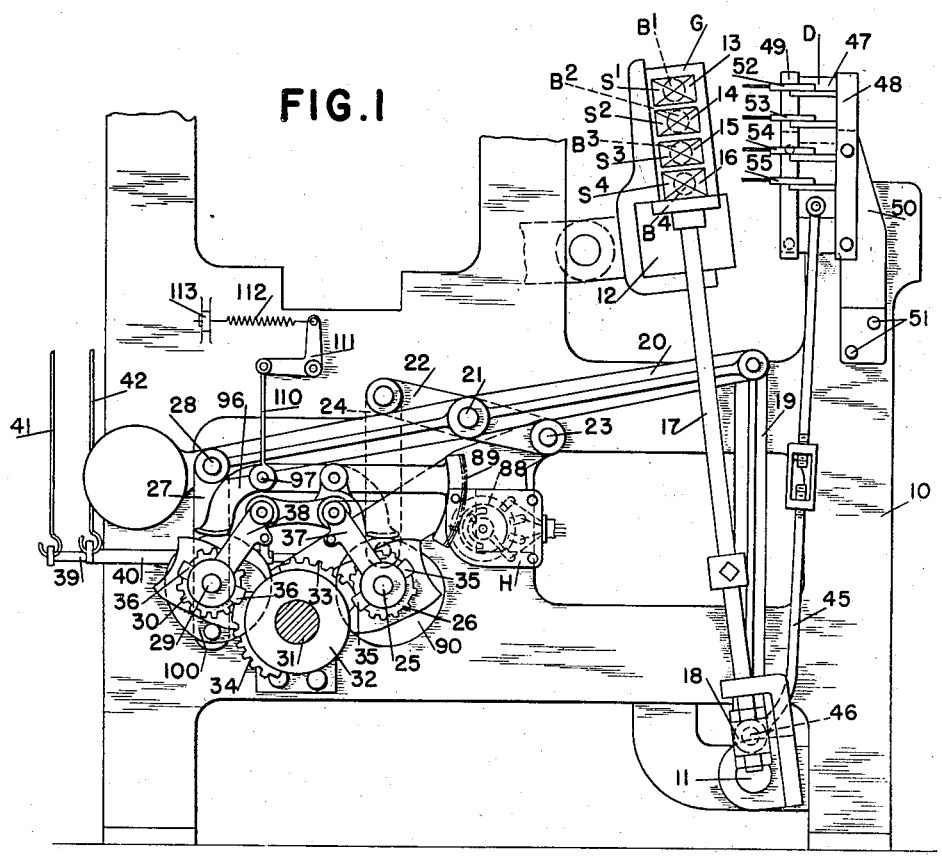

INVENTORS.
CARL P. BERGSTROM
VICTOR F. SEPAVICH.

Chas. T. Hawley
ATTORNEY.

Oct. 18, 1949.　　C. P. BERGSTROM ET AL　　2,485,134
ELECTRIC WEFT DETECTING MECHANISM
FOR DROP BOX LOOMS
Filed Dec. 14, 1948　　　　　　　　　　　　　　　2 Sheets-Sheet 2
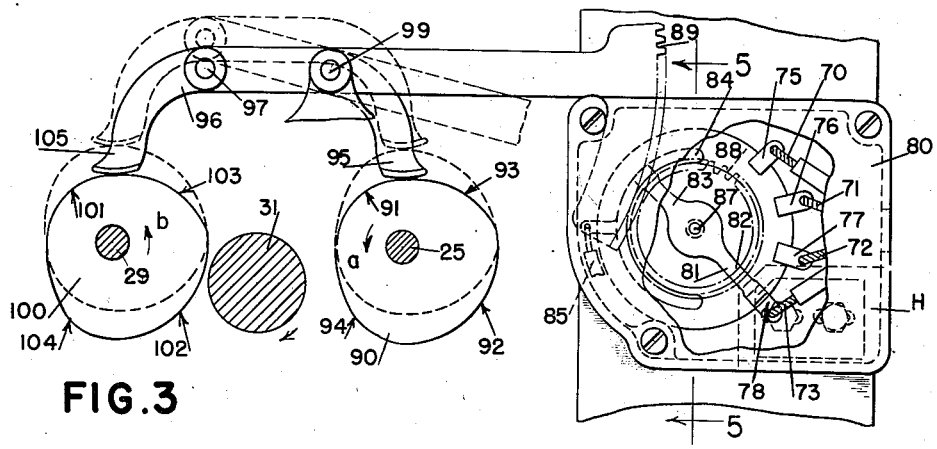
FIG.3
FIG.4
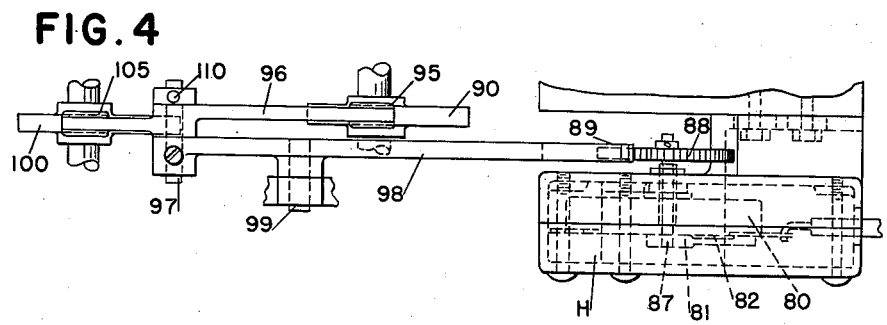
FIG.5
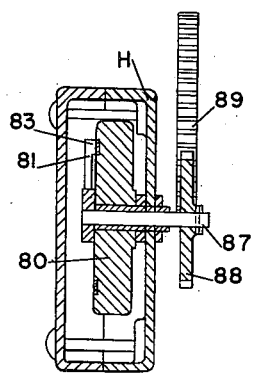
INVENTORS
CARL P. BERGSTROM.
VICTOR F. SEPAVICH.
Chas. T. Hawley
ATTORNEY.

Patented Oct. 18, 1949

2,485,134

UNITED STATES PATENT OFFICE 2,485,134

ELECTRIC WEFT DETECTING MECHANISM FOR DROP BOX LOOMS

Carl P. Bergstrom, Millbury, and Victor F. Sepavich, Worcester, Mass., assignors to Crompton & Knowles Loom Works, Worcester, Mass., a corporation of Massachusetts Application December 14, 1948, Serial No. 65,276

8 Claims. (Cl. 139—233)

This invention relates to improvements in electric weft detecting mechanism for the shifting shuttle box end of multi-shuttle looms wherein a gang of detectors are used, and it is the general object of the invention to provide a simple form of selector to connect a loom controlling circuit to the weft detector corresponding to a shuttle box which is either in or moving toward active picking position.

Fancy looms ordinarily employ a set of shifting shuttle boxes on at least one end thereof, and for pick and pick work shifting shuttle boxes are employed at both ends. When weft detection is to be effected in shifting shuttle boxes a single weft detector as is customary on the more usual types of weft replenishing looms cannot ordinarily be used, but instead a gang of detectors is employed having a detector for each cell of the shifting shuttle boxes. All the detectors of the gang detect at the same time, but only one shuttle can be active at a time. It is therefore necessary to make provision by which the detectors corresponding to the inactive shuttles shall be incapable of completing an indication of exhaustion and only the detector corresponding to the active shuttle, or a shuttle about to become active, shall be able to complete such an indication.

It is an important object of the present invention to provide a plurality of detector branch circuits, one for each detector of a gang, and a selector operated by the shuttle box operating mechanism which will connect the loom controlling circuit to but one of the branch circuits, namely, the one corresponding to the shuttle which is either active or is about to become active.

A form of shuttle box shifting mechanism which has gone into general use employs a master gear and pinions which can be moved either into or out of mesh with the master gear. These pinions are operatively connected by links to compound levers which move the shuttle boxes to any one of several positions as determined by the pattern mechanism which controls the pinions. In such looms each pinion ordinarily has only two positions relatively to the master gear, and when two of them are employed it is possible to control a four-cell gang of shuttle boxes.

It is a further object of the invention to provide an electric circuit selector controlled by a compound system of levers which is operated by the pinions of the shuttle box shifting mechanism.

When the weft detectors are arranged in a vertical gang in front of the lay detection occurs when the lay is at or near its front center position, but at this time in the loom cycle the shuttle boxes will be only partly shifted. It is another object of the invention to provide operating mechanism for the aforesaid selector controlling compound lever system which will move the latter to a position corresponding to the next shuttle to be active by the time the lay is on its front center position and while the shuttle boxes are still shifting to move the selected shuttle to picking position.

It is a more specific object of the invention to provide the aforesaid compound lever system with a segment rack to mesh with a pinion for the purpose of operating the selector as the compound levers for the latter shift to their different positions.

With these and other objects in view which will appear as the description proceeds, the invention resides in the combination and arrangement of parts hereinafter described and set forth.

Figure 2:
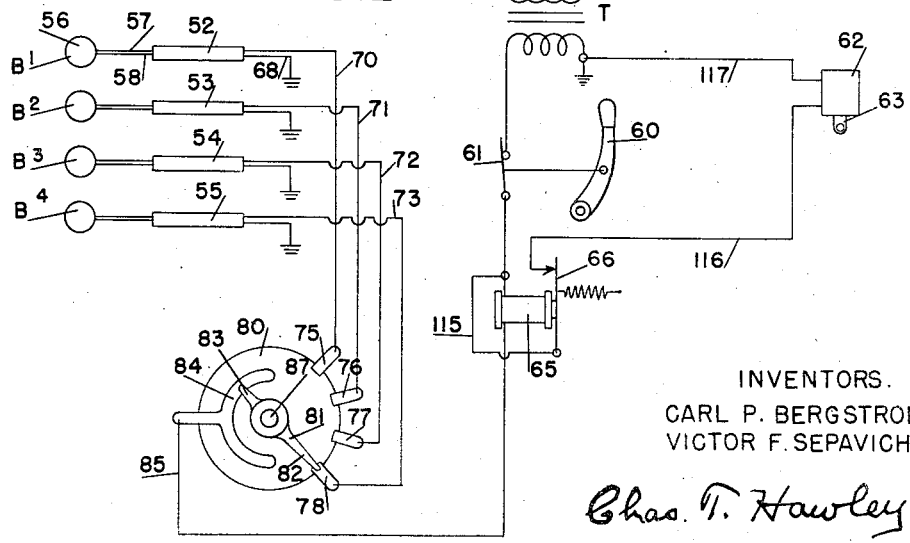

In the accompanying drawings, wherein a convenient embodiment of the invention is set forth, Fig. 1 is a side elevation of part of the loom having the invention applied thereto, the bottom shaft of the loom being in cross-section, Fig. 2 is a diagrammatic view of the electric circuits employed with the invention, Fig. 3 is an enlarged elevation of part of the structure shown in Fig. 1, parts being shown in cross section, Fig. 4 is a plan view of the structure shown in Fig. 3, and Fig. 5 is a vertical section on line 5—5 of Fig. 3.

Referring particularly to Fig. 1, the loom frame 10 supports a rocker shaft 11 around which swings a lay 12. A gang G of shuttle boxes on the lay has in the present instance four cells or shuttle boxes 13, 14, 15 and 16 for four shuttles S1, S2, S3 and S4, respectively, carrying bobbins B1, B2, B3 and B4. Gang G is mounted on a box lifter rod 17 which is attached as at 18 to the lower end of an upright link 19 the top of which is connected to a floating box lifter lever 20.

Lever 20 is pivoted as at 21 to a second lever 22 moving about a fixed pivot 23 at the right hand end thereof as viewed in Fig. 1. The left hand end of lever 22 is connected to a depending link 24 which is operatively connected at its lower end to a shaft 25 to which is secured an actuator or pinion 26. A second link 27 is pivoted at 28 to the rear part of lever 20 and has operative connection at its lower end with a shaft 29 to which is secured another actuator or pinion 30.

The bottom shaft 31 of the loom has secured thereto a mutilated master gear 32 which rotates uniformly during loom operation preferably in a clockwise direction as viewed in Fig. 1. This master gear has two sets 33 and 34 of operating teeth for cooperation respectively with the pinions 26 and 30. The latter have sliding teeth 35 and 36, respectively, which are shifted horizontally by arms 37 and 38, respectively, which are operatively connected to levers 39 and 40, respectively. These levers are rocked by links 41 and 42, respectively, which extend upwardly to any approved form of pattern control mechanism not specifically shown herein.

The links 41 and 42 can each be either in up or down position and are movable independently of each other and by their position determine whether the sliding teeth of the pinions shall be aligned with and driven by their corresponding segments on the master gear, or be in non-driving position. When a pinion turns the associated vertical link will be moved to produce a motion of the lever 20. Thus, when pinion 26 is in the position shown in Fig. 1 its link 24 is up and the center or axis 21 will be raised. When pinion 30 is in the position shown in Fig. 1 its link 27 and therefore the rear end of lever 20 will be down. This position of the pinions and their links correspond to the highest position which the gang G can occupy so that the shuttle box 16 will be in active picking position. Changes in the vertical positions of the links 24 and 27 will produce corresponding changes in the position of the gang G so that any one of the shuttle boxes 13 to 16 can be moved to active position.

The segments 33 and 34 operate their corresponding pinions during a box shifting interval which occurs during that part of the loom cycle when the lay is passing from bottom center forwardly to front center, or to the right in Fig. 1, and then rearwardly to top center, at which time box shift is ordinarily completed and picking starts. From this it will be understood that the box shifting interval will only be partly completed when the lay is on front center and that at that time in the loom cycle the shuttle box next to be in active position has not yet reached that position, assuming a different shuttle is to become active, although the pattern mechanism will have determined which of the four shuttle boxes will be active.

The shuttle box shifting mechanism thus far described is of common and well-known construction, but the invention is not necessarily limited in its application to a box motion such as that already specifically described.

The weft detectors are arranged vertically in a gang D, Fig. 1, in such manner that they can rise and fall with the shuttle box gang G. In order to effect vertical shifting of gang D a rod 45 is operatively connected at 46 to the box lifter rod 17. At its upper end rod 45 is connected to a slide 47 which is guided for vertical movement by front and back guides 48 and 49, respectively, held fixed with respect to the loom frame by a stand 50 bolted to one of the loomsides as at 51. The gang D in the present instance has four electric weft detectors 52, 53, 54 and 55, one for each shuttle box. Whenever the boxes shift the detector gang D has a similar vertical shift, but it does not partake of the back and forth motion of the lay.

During operation of the loom the gang of shuttle boxes G will move forwardly or to the right as viewed in Fig. 1 to effect engagement of the several detectors with the bobbins in the shuttles as the lay approaches front center. Each bobbin will preferably be provided with a bobbin ferrule 56, see Fig. 2, to electrically connect the two detector fingers or rods 57 and 58 of the corresponding detector. It is to be understood that each detecting unit will have two of these rods 57 and 58 and that they are normally insulated from each other and will be connected electrically only when the corresponding ferrule 56 is denuded of weft during the detecting period.

While a specific form of electric weft detector is shown the invention is not necessarily limited to this form and it will be sufficient if detectors are employed which close a contact when engaging a depleted bobbin.

Except as noted hereinafter the matter thus far described of itself forms no part of the present invention and may be of the usual construction, or varied depending upon the type of shuttle box shifting mechanism and the specific form of electric weft detector employed.

The present invention provides a plurality of detector circuit branches, one for each detector, and a selector to determine which of the branches shall be connected to the loom controlling circuit. As shown herein the detecting mechanism is for the purpose of stopping the loom, although the invention is not necessarily limited to this type of control. The loom has a shipper handle 60 which controls a switch 61, closing the latter when the loom is in operation and effecting its opening when the loom stops. The loom is provided with some form of electro-magnetic control which is shown herein as a solenoid 62 the core 63 of which when attracted due to energization of the solenoid will effect loom stoppage. This stoppage can conveniently be effected through the knock-off mechanism of a warp stop motion, although it is obvious that the invention is not limited to this particular means for stopping the loom.

As shown in Fig. 2 an electromagnet or relay 65 controls an electric switch 66. Ordinarily the electromagnet 65 is deenergized and the switch 66 is open, so that although switch 61 is closed electric power from the transformer T will not be able to energize the solenoid 62. When the electromagnet is energized, however, it closes switch 66, whereupon the solenoid is energized.

Each of the weft detectors 52—55 has its detector rod or prong 58 grounded as at 68 and has its other prong 57 connected to a lead wire. The lead wires for the detectors are designated respectively at 70, 71, 72 and 73. These wires lead to contacts 75, 76, 77 and 78, respectively, of a selector mechanism designated generally at 80. The selector mechanism has a sweep arm 81 the finger 82 of which can engage any one of the contacts 75—78, one at a time; and has another finger 83 which is in constant electrical engagement with an arcuate contact 84 connected to a wire 85.

The sweep arm 81 is secured to a small shaft 87, see Fig. 5, which is supported in a housing H and has secured thereto a pinion 88 which meshes with a segment rack 89. When the pinion is turned by the segment it causes sweep arm 81 to change its relation with the contacts 75—78.

The mechanism for turning the pinion 88 is in effect a compound lever system somewhat similar to that employed to cause shifting of the shuttle box gang G, but because of the fact that weft detection occurs during the box shifting interval it is necessary that the selector lever system operate earlier in the loom cycle than the compound lever system for the shuttle boxes.

Pinion 26 has fast therewith a positioner or cam 90, see Fig. 3, having a low area 91, a high area 92, a rising or inclined area 93, and a falling or declining area 94. This cam 90 engages a shoe 95 on a floating lever 96 pivotally connected by a stud 97 to the left end of a lever 98 the right end of which carries rack segment 89, see Figs. 3 and 4. The segment lever 98 rocks about a fixed pivot or stud 99 with which segment 89 is concentric.

Pinion 30 of the box shifting mechanism has rigid therewith a second positioner cam 100 which has low and high dwell areas 101 and 102, respectively, and inclined and declining areas 103 and 104, respectively. This second cam 100 engages a shoe 105 formed at the rear end of the floating lever 96. The disks 90 and 100 are similar but of opposite hand.

In order that the shoes 95 and 105 may always be pressed downwardly against their respective cams a spring operated pressure mechanism such as shown in Fig. 1 may be employed. This mechanism employs a rod 110 the lower end of which is pivoted on the stud 97 and the upper end of which is connected to a bell crank lever 111 connected to a tension spring 112 anchored at the rear end thereof to a fixed support, such as a clip 113. The spring causes the rod 110 to exert a downward force on stud 97 and therefore tends to force the shoes against their respective positioners or cams and also tends to raise segment 89.

As has already been stated weft detection must be completed at front center and before the box shiftings are completed. It is for this reason that the cams 90 and 100 are formed as shown more particularly in Fig. 3. The dwells 91 and 92 will each be for approximately one-fourth of the perimeter of cam 90, and the incline and decline 93 and 94 will each be for approximately one-fourth of the perimeter. Since the cam and its shuttle box operating pinion 26 has a half rotation for each shifting movement of the box the shoe 95 will move from the full to the dotted line position Fig. 3 during the time the lay is moving from bottom center to front center, the cam 90 turning in the direction of arrow $a$. Similarly, shoe 105 will be lifted from its full line to the dotted line position, Fig. 3, when cam 100 makes a half turn. These turnings of the two cams occur simultaneously, cam 100 turning in the direction of arrow $b$ to lift shoe 105 while cam 90 is lifting its shoe 95. The segment 89 and sweep arm 81 will therefore come to rest in ample time to complete a circuit through the weft detector by an empty bobbin corresponding to the shuttle box which is next to be in active position. Because of the width of the contacts 95 and that part of the finger 82 which contacts them the branch lead wires 70—73 are connected one at a time to the wire 85 slightly before the detectors contact their bobbins, although it will be obvious that this is not essential so long as there is a period during which the bobbins are contacted with their detectors simultaneously with engagement of the sweep arm with a contact. Ordinarily, however, the sweep arm will have come to rest or at least be in engagement with the selected contact 75—78 by the time the detectors engage their respective ferrules.

As shown in Fig. 2, and assuming that the lay is on front center position, with the gang G up and the bottom bobbin B4 depleted of weft, the detector 55 will complete a contact at the shuttle, or at least the two prongs 57 and 58 will be in electrical engagement with each other, and the following branch circuit will be closed: ground 68, prong 58, the ferrule 56 of bobbin B4, prong 57, lead wire 73, and contact 78. From the latter the loom controlling relay circuit is completed as follows: sweep arm 81, contact 84, wire 85, electromagnet or relay 65, switch 61, transformer T, and back to ground. This effects closure of switch 66 which will close the following solenoid circuit: transformer T, switch 61, wire 115, switch 66, wire 116, solenoid 62, and wire 117 back to the transformer.

It is obvious that if desired the relay 65 could be replaced by the solenoid, in which event the relay circuit would be unnecessary. Relay 65 may be considered an electromagnetic device which when energized effects a change in loom operation.

When the combined lever system shown more particularly in Figs. 3 and 4 shifts the segment 89 to any other of its four positions, the corresponding detector can indicate weft exhaustion and if its associated bobbin is depleted circuits similar to those already traced will be closed.

From the foregoing it will be seen that the invention sets forth simple means by which a gang of electric weft detectors mounted in front of the lay and rising and falling in register with the shuttle boxes can have their respective electric branch circuits connected one at a time and selectively to a loom controlling circuit to cause a change in loom operation, such for instance as loom stoppage. The selector mechanism includes a compound lever system which acts in advance of completion of a shifting interval of the shuttle boxes to select the branch circuit corresponding to the shuttle box which is next to be in active picking position. The segment rack is on one of the levers of the system, and the latter is operated by the actuators or pinions 26 and 30 which cause movement of the shuttle boxes. The positioners or cams 90 and 100 complete the selected movement of sweep arm 81 by the time the lay is on front center in which position of the lay detection occurs.

Having thus described the invention it will be seen that changes and modifications of the foregoing specific disclosure may be made without departing from the spirit and scope of the invention.

What is claimed as new is:

1. In an electric weft detecting system for a loom having means including two actuators movable each to either of two positions to effect the shifting of any one of four shuttle boxes to active picking position and wherein a gang of electric weft detectors, one for each shuttle box, moves in register with the shuttle boxes, a positioner moving with each actuator, mechanism operatively connected to the positioners and including a member moved by the latter in any one of four positions, depending upon the positions of the actuators and positioners, a branch electric circuit for each shuttle box and a corresponding electric weft detector, a loom controlling electric circuit, and a branch circuit selector operatively connected to said member of said mechanism and effective due to movement thereof by said actuators and positioners to electrically connect the loom controlling circuit to the branch electric circuit corresponding to the shuttle box next to be in active position.

2. In an electric weft detecting system for a loom having means including two actuators movable each to either of two positions to effect the shifting of any one of four shuttle boxes to active picking position and wherein a gang of electric weft detectors, one for each shuttle box, moves in register with the shuttle boxes, a positioner moving with each actuator, compound levers moved by the positioners to any one of four relative positions, depending upon the positions of the actuators and positioners, a branch electric circuit for each shuttle box and the corresponding electric weft detector, a loom controlling electric circuit, and a branch circuit selector operatively connected to said compound levers and effective due to movement thereof by said actuators to electrically connect the loom controlling circuit to the branch electric circuit corresponding to the shuttle box next to be in active picking position.

3. In an electric weft detecting system for a loom having means including two actuators movable each to either of two positions to effect the shifting of any one of four shuttle boxes to active picking position and wherein a gang of electric weft detectors, one for each shuttle box, moves in register with the shuttle boxes, a positioner moving with each actuator, compound levers moved by the positioners and including a lever moved by the positioners to any one of four positions, depending upon the positions of the actuators and positioners, a branch electric circuit for each shuttle box and the corresponding electric weft detector, a loom controlling electric circuit, and a branch circuit selector operatively connected to said lever and effective due to movement of said lever by said actuators to electrically connect the loom controlling circuit to the branch electric circuit corresponding to the shuttle box next to be in active picking position.

4. In an electric weft detecting system for a loom having means including two actuators movable each to either of two positions to effect the shifting of any one of four shuttle boxes to active picking position and wherein a gang of electric weft detectors, one for each shuttle box, moves in register with the shuttle boxes, a positioner moving with each actuator, compound levers moved by the positioners and including a lever provided with a segment rack moved by the actuators to any one of four positions, depending upon the positions of the actuators and positioners, a branch electric circuit for each shuttle box and the corresponding electric weft detector, a loom controlling electric circuit, and a branch circuit selector including a pinion meshing with said segment rack and effective due to movement of said lever by said actuators to electrically connect the loom controlling circuit to the branch electric circuit corresponding to the shuttle box next to be in active picking position.

5. In an electric weft detecting system for a loom having means including two actuators movable each to either of two positions to effect the shifting of any one of four shuttle boxes to active picking position and wherein a gang of electric weft detectors, one for each shuttle box, moves in register with the shuttle boxes, a positioner moving with each actuator, compound levers moved by the positioners and including a lever movable about a fixed pivot and provided with a segment rack moved by the actuators to any one of four positions, depending upon the positions of the actuators and positioners, a branch electric circuit for each shuttle box and the corresponding electric weft detector, a loom controlling electric circuit, and a branch circuit selector including a pinion meshing with said segment rack and effective due to movement of said lever by said actuators to electrically connect the loom controlling circuit to the branch electric circuit corresponding to the shuttle box next to be in active picking position.

6. In an electric weft detecting system for a loom having means including two rotary actuators movable each to either of two positions to effect the shifting of any one of four shuttle boxes to active picking position and wherein a gang of four electric weft detectors, one detector for each shuttle box, moves in register with the shuttle boxes, a rotary positioner turning with each actuator, compound levers moved by the positioners to any one of four positions, depending upon the position of the actuators and positioners, the latter constructed to complete movement of the compound levers prior to completion of the corresponding shifting of the shuttle boxes by the actuators, a branch electric circuit for each shuttle box and the corresponding electric weft detector, a loom controlling electric circuit, and a branch circuit operatively connected to said compound levers and effective due to movement thereof by said actuators to electrically connect the loom controlling circuit to the branch electric circuit corresponding to the shuttle box next to be in active picking position.

7. In electric weft detecting means for a loom wherein two actuators each movable to either of two positions effect shifting of any one of four shuttle boxes to active picking position during an interval of loom operation starting before and continuing after the lay reaches front center and wherein a gang of electric weft detectors, one for each shuttle box, moves in register with the shuttle boxes and detects the condition of weft in any of the shuttle boxes containing weft when the lay is on front center, a positioner moving with each actuator, a compound lever system moved by the positioners to any of four positions, depending upon the position of the actuators and positioners, the positioners completing movement of the compound lever system by the time the lay reaches front center during a shuttle box shifting interval and before completion of the latter, a branch electric circuit for each shuttle box and the corresponding electric weft detector, a loom controlling electric circuit, and a branch circuit selector operatively connected to said compound lever system and effective due to movement thereof by said actuators to electrically connect the loom controlling circuit to the branch electric circuit corresponding to the shuttle box next to be in active picking position.

8. In electric weft detecting means for a loom wherein two actuators each movable to either of two positions effect shifting of any one of four shuttle boxes to active picking position during an interval of loom operation starting before and continuing after the lay reaches front center and wherein a gang of electric weft detectors, one for each shuttle box, moves in register with the shuttle boxes and detects the condition of weft in any of the shuttle boxes containing weft when the lay is on front center, a positioner moving with each actuator, a compound lever system including a lever moved by the positioners to any one of four positions, depending upon the position of the actuators and positioners, a fixed pivot for said lever, a segment rack on said lever concentric with said pivot, the positioners completing movement of the compound lever system and said lever by the time the lay reaches front center and before completion of the corresponding shifting of the shuttle boxes, a branch electric circuit for each shuttle box and the corresponding electric weft detector, a loom controlling electric circuit, and a branch circuit selector including a pinion meshing with said segment rack and effective due to movement of said lever by said actuators to electrically connect the loom controlling circuit to the branch electric circuit corresponding to the shuttle box next to be in active picking position.

CARL P. BERGSTROM.
VICTOR F. SEPAVICH.

REFERENCES CITED

The following references are of record in the file of this patent:

UNITED STATES PATENTS

| Number | Name | Date |
|---|---|---|
| 1,834,360 | Wakefield | Dec. 1, 1931 |
| 1,873,109 | Bushey | Aug. 23, 1932 |
| 2,004,341 | Payne | June 11, 1935 |
| 2,135,155 | Turner | Nov. 1, 1938 |
| 2,245,445 | Schwabe | June 10, 1941 |